(12) United States Patent
Kimmel et al.

(10) Patent No.: US 9,134,917 B2
(45) Date of Patent: Sep. 15, 2015

(54) HYBRID MEDIA STORAGE SYSTEM ARCHITECTURE

(75) Inventors: Jeffrey S. Kimmel, Chapel Hill, NC (US); Steven R. Kleiman, Los Altos, CA (US); Steven C. Miller, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 82 days.

(21) Appl. No.: 12/517,473

(22) PCT Filed: Feb. 11, 2009

(86) PCT No.: PCT/US2009/000849
§ 371 (c)(1),
(2), (4) Date: Jun. 3, 2009

(87) PCT Pub. No.: WO2009/102425
PCT Pub. Date: Aug. 20, 2009

(65) Prior Publication Data
US 2011/0035548 A1    Feb. 10, 2011

Related U.S. Application Data

(60) Provisional application No. 61/028,107, filed on Feb. 12, 2008.

(51) Int. Cl.
*G06F 3/06* (2006.01)
*G06F 11/10* (2006.01)
*G06F 17/30* (2006.01)

(52) U.S. Cl.
CPC .............. *G06F 3/0647* (2013.01); *G06F 3/061* (2013.01); *G06F 3/0616* (2013.01);

(Continued)

(58) Field of Classification Search
CPC .... G06F 12/0866; G06F 3/064; G06F 3/0685
See application file for complete search history.

(56) References Cited

U.S. PATENT DOCUMENTS 5,129,088 A * 7/1992 Auslander et al. ................ 711/1
5,778,418 A    7/1998 Auclair et al.

(Continued)

FOREIGN PATENT DOCUMENTS

| EP | 1 873 624 | 1/2008 |
|----|-----------|--------|
| JP | 8152975   | 6/1996 |

(Continued)

OTHER PUBLICATIONS

Cheng et al., Large Data Block Size,1998, IBM Corporation, 7 pages.*

(Continued)

*Primary Examiner* — Gary W Cygiel
(74) *Attorney, Agent, or Firm* — Cesari and McKenna, LLP

(57) ABSTRACT

A hybrid media storage architecture has a log-structured file system configured to control a plurality of different storage media organized as hybrid storage media that cooperate to provide a total storage space of a storage system. The log-structured file system is configured to perform initial placement and migration of data, as well as fine-grain write allocation of the data, among storage space locations of the hybrid storage media to thereby improve the performance characteristics of the media. By defining and implementing heuristics and policies directed to, e.g., types of data, the file system may initially place data on any of the different media and thereafter migrate data between the media at fine granularity and without the need for manual enforcement.

21 Claims, 5 Drawing Sheets

(52) U.S. Cl.
CPC ........... *G06F 3/0643* (2013.01); *G06F 3/0685* (2013.01); *G06F 11/108* (2013.01); *G06F 17/30185* (2013.01); *G06F 17/30218* (2013.01); *G06F 2211/109* (2013.01)

(56) References Cited

U.S. PATENT DOCUMENTS

| | | | |
|---|---|---|---|
| 5,819,292 | A | 10/1998 | Hitz et al. |
| 6,148,368 | A | 11/2000 | DeKoning |
| 6,219,693 | B1 | 4/2001 | Napolitano et al. |
| 6,516,380 | B2 | 2/2003 | Kenchammana-Hoskote et al. |
| 7,200,715 | B2 | 4/2007 | Kleiman et al. |
| 7,409,494 | B2 | 8/2008 | Edwards et al. |
| 2002/0169932 | A1* | 11/2002 | Burns et al. .................... 711/154 |
| 2003/0229698 | A1* | 12/2003 | Furuhashi et al. ............ 709/226 |
| 2005/0172074 | A1 | 8/2005 | Sinclair |
| 2005/0246401 | A1* | 11/2005 | Edwards et al. .............. 707/205 |
| 2005/0251617 | A1 | 11/2005 | Sinclair et al. |
| 2007/0083575 | A1 | 4/2007 | Leung et al. |
| 2009/0172335 | A1* | 7/2009 | Kulkarni et al. .............. 711/170 |

FOREIGN PATENT DOCUMENTS

| | | |
|---|---|---|
| JP | H10154045 | 6/1998 |
| JP | H11272424 | 10/1999 |
| JP | 2006350599 | 12/2006 |
| JP | 200772813 | 3/2007 |
| JP | 2007-108981 | 4/2007 |
| JP | 2008-15623 | 1/2008 |
| JP | 2011-515727 | 5/2011 |
| WO | 2008/005211 | 1/2008 |
| WO | 2009/102425 | 8/2009 |

OTHER PUBLICATIONS

U.S. Appl. No. 61/028,107, filed Feb. 12 2008, entitled Hybrid Media Storage System Architecture, by J. Kimmel, et al., 30 pages.
U.S. Appl. No. 61/028,094, filed Feb. 12, 2008, entitled Cache-Based Storage System Architecture, by Kleiman, et al., 28 pages.
Utility U.S. Appl. No. 12/369,502, entitled Cache-Based Storage System Architecture, filed Feb. 11, 2009, 31 pages.
Baek, Sung Hoon, et al., "Matrix-Stripe-Cache-Based Contiguity Transform for Fragmented Writes in RAID-5", IEEE Transactions on Computers, vol. 56, No. 8, Aug. 2007, pp. 1040-1054.
Gal, Eran, et al., "Algorithms and Data Structures for Flash Memories", ACM Computing Surveys, vol. 37, No. 2, Jun. 2005, pp. 138-163.
$EMC^2$, "EMC in Major Storage Performance Breakthrough; First with Enterprise-Ready Solid State Flash Drive Technology", On-Line Press Release; http://www.prnewswire.com/mnr/emc/31368/, Released Jan. 14, 2008, EMC Corporation, Hopkington MA, printed Jan. 30, 2009, 4 pages.
$EMC^2$, "EMC Symmetrix DMX Series" 01/08 Data Sheet C1005.11, EMC Corporation, Hopkinton MA, Jan. 2008, 8 pages.
Storagezilla, "Enterprise FLASH Drives for DMX-4 (Completed)," On-Line Press Release; http://storagezilia.typepad.com/storagezilla/2008/01/enterprise-fias.html, released Jan. 14, 2008, Storagezilla, Printed Jan. 30, 2009, 8 pages.
NetApp, Inc., "PCT Notification of Transmittal of the International Search Report and the Written Opinion of the International Searching Authority, or the Declaration", International Filing No. PCT/US2009/000849, International Filing Date: Feb. 11, 2009, Date of Mailing May 20, 2009, 15 pages.

\* cited by examiner

HYBRID MEDIA STORAGE SYSTEM ARCHITECTURE

RELATED APPLICATIONS

The present invention is a 371 of PCT/US09/00849, dated Feb. 11, 2009, which claims the benefit of commonly-owned, U.S. Provisional Application No. 61/028,107, filed Feb. 12, 2008, entitled HYBRID MEDIA STORAGE SYSTEM ARCHITECTURE, by Kimmel, et al., the contents of which are hereby incorporated by reference.

The present invention is also related to commonly-owned, copending U.S. Pat. No. 8,549,222, filed Feb. 11, 2009, entitled CACHE-BASED STORAGE SYSTEM ARCHITECTURE, by Kleiman, et al.

FIELD OF THE INVENTION

The present invention relates to storage systems and, more specifically, to a storage architecture of a storage system.

BACKGROUND OF THE INVENTION

A storage system is a computer that provides storage service relating to the organization of data on writable persistent storage media, such as non-volatile memories and disks. The storage system may be configured to operate according to a client/server model of information delivery to thereby enable many clients (e.g., applications) to access the data served by the system. The storage system typically employs a storage architecture that serves the data in file system and block formats with random and streaming access patterns. Disks generally provide good streaming performance (e.g., reading of large sequential blocks or "track reads") but do not perform well on random access (i.e., reading and writing of individual disk sectors). In other words, disks operate most efficiently in streaming or sequential mode, whereas small random block operations can substantially slow the performance of disks.

One way to improve performance of the storage architecture of the storage system is through the use of hybrid storage media, e.g., by intermixing relatively expensive electronic storage, such as solid-state devices (SSDs), with relatively inexpensive magnetic storage, e.g., such as hard disk drives (HDDs), to provide a total storage space of the system. Typically, users or administrators of such conventional storage systems identify and isolate frequently accessed (i.e., "hot") data that could most benefit from being stored in SSDs, with the remaining data being stored on the HDDs. However, identification and isolation of such hot data is typically performed and enforced manually, thus requiring time-consuming levels of effort by the administrators.

In addition, the administrators of these conventional systems typically render decisions to configure the physical layout of the SSDs and HDDs to create one or more volumes, each of which has a logical arrangement of volume block number (vbn) storage space used to organize data. The administrators may then render decisions to employ static or fixed allocations of the data, e.g., the data associated with a first range of vbns resides in one group of storage based in the SSDs, while data associated with a second range of vbns resides in another group of storage based in HDDs. However, implementation of such fixed data allocation decisions is time-consuming and expensive, particularly when changes are made to the allocations.

SUMMARY OF THE INVENTION

The present invention overcomes the disadvantages of the prior art by providing a hybrid media storage architecture having a log-structured file system configured to control a plurality of different storage media organized as hybrid storage media that cooperate to provide a total storage space of a storage system. To that end, the log-structured file system is configured to perform initial placement and migration of data, as well as fine-grain write allocation of the data, among storage space locations of the hybrid storage media to thereby improve the performance characteristics of the media. By defining and implementing heuristics and policies directed to, e.g., types of data the file system may initially place (write) data on any of the different media and thereafter migrate (move) data between the media at fine granularity and without the need for manual enforcement.

In an illustrative embodiment, the hybrid storage media includes relatively expensive electronic storage media, such as solid-state devices (SSDs), and relatively inexpensive magnetic storage media, such as hard disk drives (HDDs). The HDDs are apportioned into regions of related (file) data in accordance with a data layout format of the log-structured file system. The file system may then implement placement of data within the regions of the HDDs by, e.g., designating block locations on the HDDs where data may reside. In addition, the file system applies log-structured techniques to improve random write performance of the SSDs and to move data in fine granularity between, e.g., the SSDs and HDDs.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENTS

Figure 1:
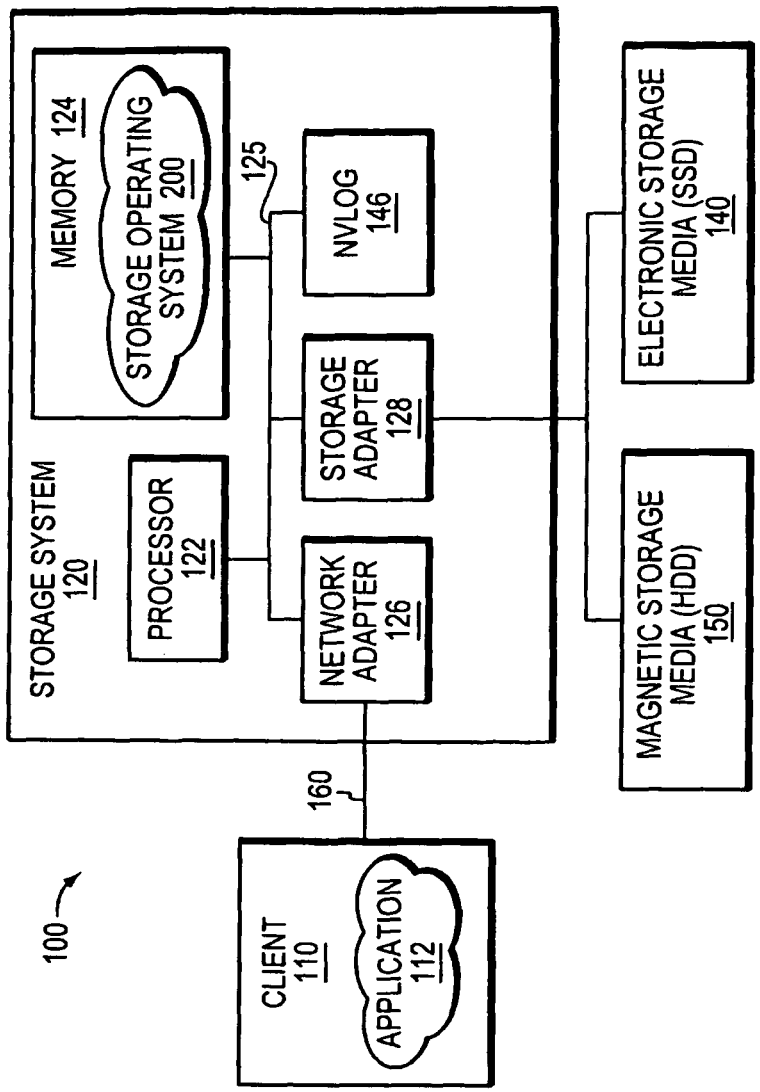
FIG. 1 is a schematic block diagram of an environment including a storage system that may be advantageously used with the present invention.

FIG. 1 is a schematic block diagram of an environment 100 including a storage system that may be advantageously used with the present invention. The storage system 120 is a computer that provides storage services relating to the organization of information on writable, persistent electronic and magnetic storage media. To that end, the storage system 120 comprises a processor 122, a memory 124, a network adapter 126, a storage adapter 128 and non-volatile log storage (NV-LOG) 146 interconnected by a system bus 125. The storage system 120 also includes a storage operating system 200 that implements a virtualization system to logically organize the information as a hierarchical structure of data containers, such as files and logical units (LUNs), on the electronic and magnetic storage media 140, 150.

The memory 124 comprises storage locations that are addressable by the processor and adapters for storing software programs and data structures associated with the embodiments described herein. The processor and adapters may, in turn, comprise processing elements and/or logic circuitry configured to execute the software programs and manipulate the data structures. The storage operating system 200, portions of which are typically resident in memory and executed by the processing elements, functionally organizes the storage system by, inter alia, invoking storage operations in support of software processes executing on the system. It will be apparent to those skilled in the art that other processing and memory means, including various computer readable media, may be used to store and execute program instructions pertaining to the embodiments described herein.

The NVLOG 146 illustratively comprises electronic storage embodied as a solid-state, non-volatile random access memory (NVRAM) array having either a back-up battery or other built-in last-state-retention capabilities (e.g., non-volatile semiconductor memory) that is capable of maintaining information in light of a failure to the storage system. In an illustrative embodiment, the NVLOG 146 may be used to temporarily store ("log") certain data access operations, such as write operations, that are processed by the virtualization system prior to storing the data associated with those operations to the electronic and/or magnetic storage media during a consistency model event, e.g., a consistency point (CP), of the system. An example of a consistency point is described in U.S. Pat. No. 5,819,292, issued Oct. 6, 1998, entitled Method for Maintaining Consistent States of a File System and for Creating User-Accessible Read-Only Copies of a File System, by David Hitz, et al. and assigned to Network Appliance, Inc., which is hereby incorporated by reference.

The network adapter 126 comprises the mechanical, electrical and signaling circuitry needed to connect the storage system 120 to a client 110 over a computer network 160, which may comprise a point-to-point connection or a shared medium, such as a local area network. The client 110 may be a general-purpose computer configured to execute applications 112, such as a database application. Moreover, the client 110 may interact with the storage system 120 in accordance with a client/server model of information delivery. That is, the client may request the services of the storage system, and the system may return the results of the services requested by the client, by exchanging packets over the network 160. The clients may issue packets including file-based access protocols, such as the Common Internet File System (CIFS) protocol or Network File System (NFS) protocol, over TCP/IP when accessing information in the form of files. Alternatively, the client may issue packets including block-based access protocols, such as the Small Computer Systems Interface (SCSI) protocol encapsulated over TCP (iSCSI) and SCSI encapsulated over FC (FCP), when accessing information in the form of LUNs.

The storage adapter 128 cooperates with the storage operating system 200 executing on the storage system to access information requested by the client. The information may be stored on the magnetic storage media 150, which is illustratively embodied as hard disk drives (HDDs), as well as the electronic storage media 140, which is illustratively configured to provide a persistent, storage space capable of maintaining data, e.g., in the event of a power loss to the storage system. Accordingly, the electronic storage media 140 may be embodied as a large-volume, random access memory array of solid-state devices (SSDs) having either a back-up battery, or other built-in last-state-retention capabilities (e.g., a flash memory), that holds the last state of the memory in the event of any power loss to the array.

In an illustrative embodiment, the storage adapter for the SSDs may be shared with the HDDs; however, those skilled in the art will understand that the SSDs and HDDs may have separate adapters. The storage adapter includes input/output (I/O) interface circuitry that couples to the HDDs and SSDs over an I/O interconnect arrangement, such as a conventional high-performance, Fibre Channel serial link topology. Yet, those skilled in the art will understand that the SSD storage may be connected more directly, e.g., by PCIe rather than a storage adapter. The information is retrieved by the storage adapter and, if necessary, processed by the processor 122 (or the adapter 128) prior to being forwarded over the system bus 125 to the network adapter 126, where the information is formatted into a packet and returned to the client 110.

Figure 2:
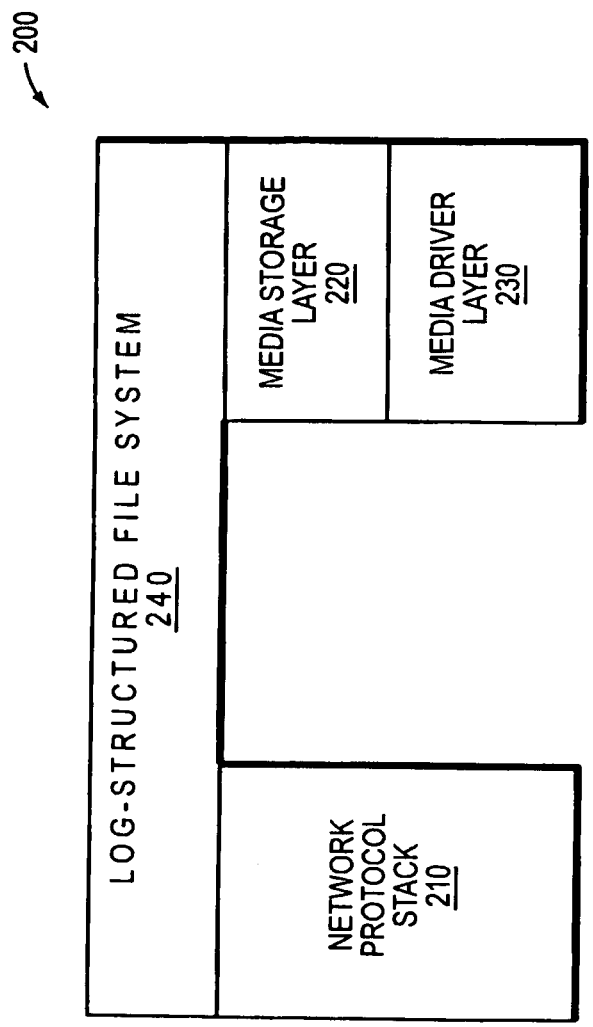
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers, including a network driver layer (e.g., an Ethernet driver), a network protocol layer (e.g., an Internet Protocol layer and its supporting transport mechanisms, the Transport Control Protocol layer and the User Datagram Protocol layer), as well as a file system protocol server layer (e.g., a CIFS server, a NFS server, etc.) organized as a network protocol stack 210. In addition, the storage operating system 200 includes a media storage layer 220 that implements a storage media protocol, such as a Redundant Array of Independent (or Inexpensive) Disks (RAID) protocol, and a media driver layer 230 that implements a storage media access protocol such as, e.g., a Small Computer Systems Interface (SCSI) protocol. As described herein, the media storage layer 220 may alternatively be implemented as a parity protection (RAID) module and embodied as a separate hardware component, such as a RAID controller.

Bridging the storage media software layers with the network and file system protocol layers is a virtualization system that may be embodied as a file system, such as a log-structured file system 240. The log-structured file system illustratively implements data layout techniques that improve read and write performance to the electronic and magnetic storage media 140, 150. For example, as described further herein, the log-structured file system 240 is configured to perform placement, migration and write allocation of the data among the different storage media to improve the performance characteristics of the media.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present invention is directed to a hybrid media storage architecture having a log-structured file system configured to control a plurality of different storage media organized as hybrid storage media that cooperate to provide a total storage space of a storage system. To that end, the log-structured file system is configured to perform initial placement and migration of data, as well as fine-grain write allocation of the data, among storage space locations of the hybrid storage media to thereby improve the performance characteristics of the media. By defining and implementing heuristics and policies directed to, e.g., types of data, the file system may initially place (write) data on any of the different media and thereafter migrate (move) data between the media at fine granularity and without the need for manual enforcement.

In an illustrative embodiment, the hybrid storage media includes relatively inexpensive magnetic storage media 150 constructed using an array of relatively slow disks or HDDs (hereinafter "HDD array"). The hybrid storage media also includes relatively expensive electronic storage media constructed using an array of non-volatile, NAND flash devices or SSDs (hereinafter "SSD array"). The flash devices are illustratively block-oriented devices having good (random) read performance, i.e., read operations to flash devices are substantially faster than write operations, primarily because of their storage model. However, it will be understood to those skilled in the art that other block-oriented, non-volatile electronic and magnetic devices may be used in accordance with the teachings of the invention.

Data stored on a flash device is accessed (e.g., via read and write operations) in units of pages, which are illustratively 4 kilobytes (kB) in size, although other page sizes (e.g., 2 kB) may also be advantageously used with the present invention. To rewrite previously written data on a page, the page must be erased; yet the unit of erasure is a block comprising a plurality of (e.g., 64) pages, i.e., an erase block having a size of 256 kB. Therefore, even though data stored on the device can be accessed (read and written) on a page basis, clearing or erasing of the device takes place on a block basis. A reason for the slow write performance of a flash device involves management of free space in the device, i.e., if there is not sufficient storage space to accommodate write operations to pages of a block, valid data must be moved to another block within the device, so that the pages of an entire block can be erased and freed for future allocation. Such write behavior of the flash device typically constrains its effectiveness in systems where write performance is a requirement. The log-structured file system described herein is employed, in part, to improve write performance from the flash devices of the SSD array.

Hybrid Media Storage Architecture

Figure 3:
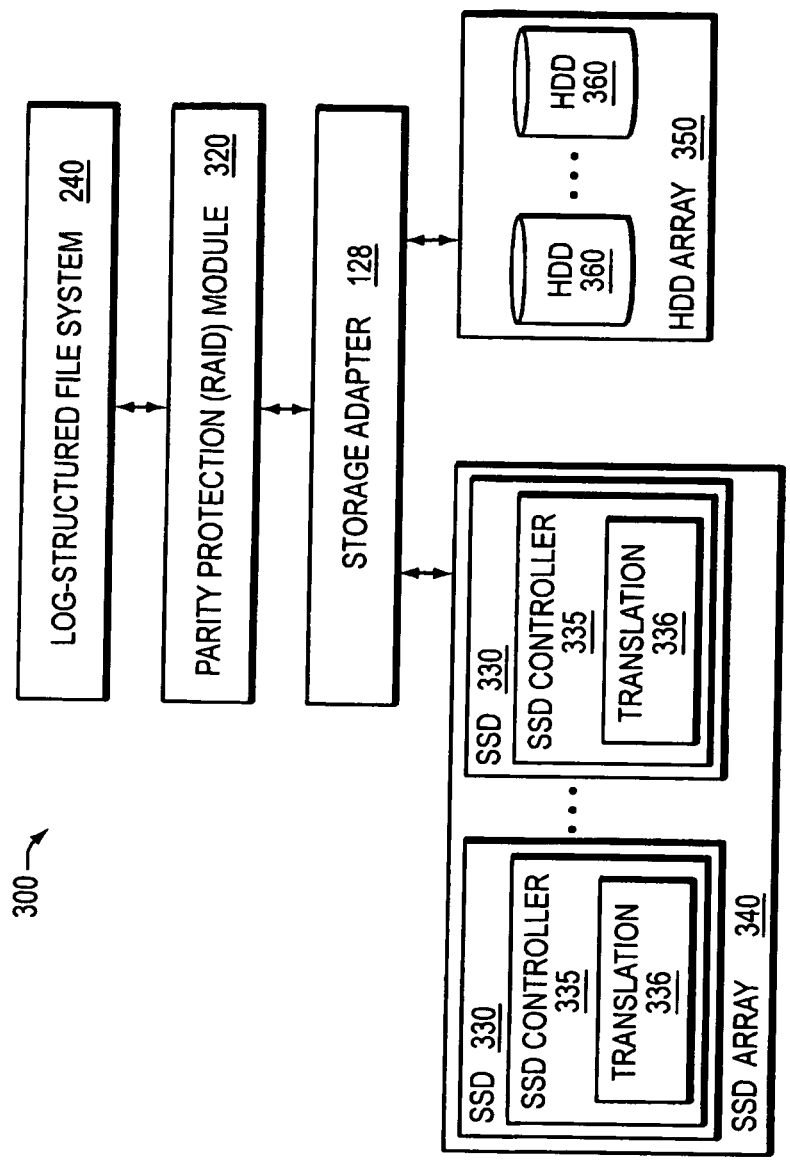
FIG. 3 is a schematic block diagram illustrating organization of a hybrid media storage architecture of the present invention.

FIG. 3 is a schematic block diagram illustrating organization of the hybrid media storage architecture 300 of the present invention. The architecture includes the log-structured file system 240 disposed over a parity protection (RAID) module 320 to control operation of the SSDs 330 of SSD array 340 and HDDs 360 of HDD array 350 to provide a total storage space of the storage system 120. Storage adapter 128 implements a storage protocol for accessing the media (flash or disk). In an illustrative embodiment, there may be one or more storage adapters 128 used to access the HDD and/or SSD arrays 350, 340. As described further herein, each SSD in the SSD array 340 has its own internal SSD controller 335 implementing translation logic 336, i.e., each SSD of the array 340 has associated translation logic 336 that is illustratively provided by the SSD controller 335.

The SSD controller 335 exports geometry information to the RAID module 320, wherein the geometry information can include, e.g., a model type of device and the size (number of blocks) of the device, e.g., in terms of device block numbers (dbns) for use by the module 320. In the case of the SSD array 340, a dbn is illustratively a logical address that the SSD controller 335 presents to the RAID module and that is subject to translation mapping inside the SSD 330 to a flash physical address. The SSD controller illustratively presents a 512 byte per sector interface, which may be optimized for random write access at block sizes of, e.g., 4 kB.

As noted, the log-structured file system 240 implements data layout techniques that improve read and write performance to SSD array 340 of electronic storage media 140, as well as to HDD array 350 of magnetic storage media 150. For example, the log-structured file system has a first data layout format that provides fast write access to data containers, such as files, thereby enabling efficient servicing of random (and sequential) data access operations directed to the SSD array 340. To that end, the file system illustratively implements a first set of write anywhere techniques to enable placement of data anywhere in free, available space on the SSDs 330 of the SSD array 340.

Although it improves write performance, the write anywhere property of the file system 240 may often fragment sequential data, which manifests as performance degradation for certain storage media, such as HDDs 360, because of the mechanical positioning required to access the fragmented data during read operations (and, in particular, during sequential read operations). However, since the SSD array 340 is constructed in this embodiment of SSDs 330, random access is consistent (i.e., not based on mechanical positioning, as with HDDs). Accordingly, the log-structured file system 240 cooperates with the SSDs to provide an ideal data layout engine for the SSD array 340 that improves write performance without degrading the sequential read performance of the array.

In addition, the log-structured file system 240 has a second data layout format that provides fast sequential read access to large files stored on the HDDs to enable efficient servicing of data stored on the HDD array 350. To that end, the file system illustratively implements a second set of techniques to move data to the HDDs 360 in a streaming fashion using a data layout construct, e.g., a "tetris" I/O transaction, that represents an array of data blocks on the HDDs characterized by row and column dimensions. An example of such an I/O transaction is described in U.S. Pat. No. 7,200,715, issued Apr. 3, 2007, entitled Method for Writing Contiguous Arrays of Stripes in a RAID Storage System Using Mapped Block Writes, by Steven R. Kleiman, et al. and assigned to Network Appliance, Inc., which is hereby incorporated by reference. In this context, the dimensions include a track (i.e., the column dimension) on each HDD by a RAID group width (i.e., the row dimension), wherein the depth of the track is illustratively a "chunk" (e.g., 256 kB) on each HDD. Notably, the tetris I/O transaction may span multiple stripes (i.e., 2 or more rows) of the RAID group. The file system 240 also leverages the fast random read performance capabilities of the SSD array 340 to migrate or move selected data to the HDD array 350 in a streaming fashion (e.g., in accordance with a tetris I/O transaction), thereby improving performance of the HDDs. By enabling operation of the HDD array 350 in sequential or streaming mode for a majority of its accesses, the hybrid media storage architecture 300 enables use of the slow, inexpensive HDDs to provide higher bandwidth and lower latency performance to client applications 112 than conventional storage systems.

In an illustrative embodiment, the log-structured file system 240 is a message-based system having a format representation that is block-based using, e.g., 4 kB blocks and using index nodes ("inodes") to describe the data containers, e.g., files. As described herein, the log-structured file system implements an arbitrary per object store (e.g., file block number) to physical store (e.g., physical volume block number) mapping. The granularity of mapping is illustratively block-based ("fine granularity") to ensure accommodation of small allocations (e.g., 4 kB) to fill in the available storage space of the media. However, it will be understood those skilled in the art that the hybrid media storage architecture should be applicable to any kind of object that is implemented on storage and that implements translation sufficient to provide fine granularity to accommodate block-based placement.

The file system also illustratively uses data structures to store information for the heuristics and policies, as well as to store metadata describing its layout on storage devices of the arrays. The file system 240 provides semantic capabilities for use in file-based access to information stored on the storage devices, such as the SSDs 330 of SSD array 340 and the HDDs 360 of HDD array 350. In addition, the file system provides volume management capabilities for use in block-based access to the stored information. That is, in-addition to providing file system semantics, the file system 240 provides functions such as (i) aggregation of the storage devices, (ii) aggregation of storage bandwidth of the devices, and (iii) reliability guarantees, such as mirroring and/or parity (RAID).

As for the latter, the log-structured file system 240 further cooperates with the parity protection (RAID) module 320, e.g., of media storage layer 220, to control storage operations to the SSD array 340 and HDD array 350. In the case of the SSD array 340, there is a hierarchy of reliability controls illustratively associated with the SSDs of the array. For example, each SSD 330 incorporates error correction code (ECC) capabilities on a page basis. This provides a low level of reliability control for the page within a flash block. A higher level of reliability control is further implemented when embodying flash blocks within a plurality of SSDs to enable recovery from errors when one or more of those devices fail.

The high level of reliability control is illustratively embodied as a redundancy arrangement, such as a RAID level implementation, configured by the RAID module 320. Storage of information is preferably implemented as one or more storage volumes that comprise one or more SSDs/HDDs cooperating to define an overall logical arrangement of volume block number space on the volume(s). Here, the RAID module 320 organizes the SSDs/HDDs within a volume as one or more parity groups (e.g., RAID groups), and manages parity computations and topology information used for placement of data on the SSDs/HDDs of each group. The RAID module further configures the RAID groups according to one or more RAID implementations, e.g., a RAID 1, 4, 5 and/or 6 implementation, to thereby provide protection over the SSDs/HDDs in the event of, e.g., failure to one or more SSDs/HDDs. That is, the RAID implementation enhances the reliability/integrity of data storage through the writing of data "stripes" across a given number of SSDs/HDDs in a RAID group, and the appropriate storing of redundant information, e.g., parity, with respect to the striped data.

In the case of the SSD array 340, the RAID module 320 illustratively organizes a plurality of SSDs as one or more parity groups (e.g., RAID groups), and manages parity computations and topology information used for placement of data on the devices of each group. To that end, the RAID module further organizes the data as stripes of blocks within the RAID groups, wherein a stripe may comprise correspondingly located flash pages across the SSDs. That is, a stripe may span a first page 0 on SSD 0, a second page 0 on SSD 1, etc. across the entire RAID group with parity being distributed among the pages of the devices. Note that other RAID group arrangements are possible, such as providing a logical RAID implementation wherein every predetermined (e.g., $8^{th}$) block in a file is a parity block.

The volumes may be embodied as virtual volumes and further organized as one or more aggregates of, e.g., the SSD array 340 and HDD array 350. Aggregates and virtual volumes are described in U.S. Pat. No. 7,409,494 titled Extension of Write Anywhere File System Layout, by John K. Edwards et al. and assigned to Network Appliance, Inc., which is hereby incorporated by reference. Briefly, an aggregate comprises one or more groups of SSDs/HDDs, such as RAID groups, that are apportioned by the file system into one or more virtual volumes (vvols) of the storage system. Each vvol has its own logical properties, such as "point-in-time" data image (i.e., snapshot) operation functionality, while utilizing the techniques of the file system layout implementation. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space.

Each vvol may be associated with a container file, which is a "hidden" file (not accessible to a user) in the aggregate that holds every block in use by the vvol. When operating on a vvol, the file system 240 uses topology information provided by the RAID module 320 to translate a vvbn (e.g., vvbn X) into a dbn location on an SSD/HDD. The vvbn identifies a file block number (fbn) location within the container file, such that a block with vvbn X in the vvol can be found at fbn X in the container file. The file system uses indirect blocks of the container file to translate the fbn into a physical vbn (pvbn) location within the aggregate, which block can then be retrieved from a storage device using the topology information supplied by the RAID module 320.

In an illustrative embodiment, the RAID module 320 exports the topology information for use by the file system 240 when performing write allocation of data, i.e., when searching for free, unallocated space in the vvbn storage space of the SSD array 340 and HDD array 350. The topology information illustratively comprises pvbn-to-dbn mappings. For the HDD array 350, the HDDs are apportioned into regions of related (file) data in accordance with the second data layout format of the log-structured file system. The file system may then implement placement of data within the regions of the HDDs by, i.e., designating block locations on the HDDs where data may reside, as described father herein.

Specifically, the second data layout format of the log-structured file system 240 arranges related file data on the HDDs within the regions, wherein each region comprises a predetermined amount of HDD storage space represented by, e.g., contiguous HDD blocks. Block allocation accounting structures used by the log-structured file system to perform write allocation are sized to accommodate writing of data to the array 350 in the second data layout format. Illustratively, at least two regions contain a contiguous range of fbns to hold a set of related file data (e.g., file A, snapshot of file A, de-duplication of file A, etc). In other words, the regions may be characterized by extents of relatively contiguous fbns on the HDDs 360. If a sequential read operation is performed to any one of the set of related file data, a substantial fraction of that data may be retrieved from both of the regions.

For the SSD array 340, block allocation accounting structures used by the log-structured file system to perform write allocation are sized to accommodate writing of data to the array in the first data layout format, e.g., a sequential order. To that end, the file system 240 illustratively performs write allocation and cooperates with the SSD controller 335, which is responsible for assuring sequential writes to the (e.g., 2560) flash blocks. Once a flash block is erased and designated "freed" (e.g., as a free vvbn), data may be written (in accordance with write operations of a CP) sequentially through the sixty-four 4 kB pages (e.g., page 0 through page 63) in the flash block, at which time a next free flash block is accessed and write operations occur sequentially from page 0 to page 63. The accounting structures, e.g., free block maps, used by the file system 240 are illustratively maintained by a segment cleaning process that, in an illustrative embodiment, may interact with the SSD controller, e.g., with respect to block management.

Illustratively, segment cleaning is performed to free-up one or more selected regions that indirectly map to flash blocks. Pages of these selected regions that contain valid data ("valid pages") are moved to different regions and the selected regions are freed for subsequent reuse. Segment cleaning consolidates fragmented free space to improve write efficiency, e.g., to underlying flash blocks. In this manner, operation of the file system 240 is leveraged to provide write anywhere capabilities, including segment cleaning, on the SSD array 340. Illustratively, the segment cleaning process may be embodied as a scanner that operates with a write allocator within file system to traverse (walk) buffer and inode trees when "cleaning" (clearing) the SSDs.

Translation Mapping

As noted, translation mapping is performed by translation logic 336 associated with each SSD controller 335 of the hybrid media storage architecture 300. The log-structured file system 240 performs write allocation to the SSD array 340 and cooperates with the RAID module 320 to control storage operations to the array. Accordingly, a vvbn-to-dbn mapping is needed to determine where to place write data on the array 340. The translation mapping is thereafter configured to translate (i.e., map) the dbns to flash page addresses of the underlying SSD array. Reasons for providing such translation mapping, rather than a direct mapping, between the dbns presented to a user of the SSD and the SSD array include wear leveling and improved random write performance.

Wear Leveling

Broadly stated, wear leveling is provided to reduce failure of an SSD 330 due to repeated erasure and writing of the device. To that end, the duty cycle is illustratively on a per erase block granularity, i.e., the SSD as a whole may not fail, but each erase block may fail after it has been erased and re-written a number of times. As used herein, wear leveling denotes constantly moving the locations where data is written to the SSD array 340 and, in particular, to each SSD. If some locations of the SSD array become more heavily-used than others, wear leveling inhibits the writing of frequently accessed data to those locations and moves infrequently accessed data into those locations. The frequently accessed data may then be written to the other locations of the array.

Accordingly and in an illustrative embodiment, the translation logic of the SSD controller 335 (e.g., implemented inside a SSD or in software above the SSD array) is configured to perform wear leveling at an erase-block mapping granule. Each time a unit of an erase block is accessed via a write operation, the translation logic writes (moves) that erase block to a new location in the SSD array 340 and makes the previous location of the block available for re-use by a subsequent write operation. Wear leveling illustratively occurs within each replaceable unit (SSD) because as an erase block wears out, storage capacity of the SSD is lost. Although wear leveling could be performed at a level higher than the SSD, it is important that such wear leveling not be performed over merely portions of the SSD because that may cause other portions to wear out at different times. In fact, it is desirable that wear leveling span an entire SSD to ensure that the blocks of the device wear out more or less at the same time.

Random Write Performance

Assume a conventional wear leveling technique that, in response to a write operation directed to certain pages within a first block of an SSD, (i) erases a second block, (ii) moves old data in pages located at the beginning of the first block to the second block, (iii) writes the new data in its sequential location in the second block after the moved data and (iv) then moves the remainder of the old data from the first block to the second block. Assume further that the new data is 4 kB (one page) in length. In order to perform this write operation, much more data (e.g., 256 kB) is moved (copied) than is newly written, thereby limiting the efficiency of the operation, as well as the write throughput of the SSD. For example, if the SSD is capable of a 100 MB per second throughput and small, random 4 kB write operations are performed to the SSD, then the write performance of the SSD is limited to a few megabytes per second if it is necessary to copy an entire block for each random write operation.

A more efficient translation mapping of the hybrid media storage architecture 300 involves a log-structured technique that finds blocks having a relatively high amount of free space and cleans them to achieve improved random write performance. Thereafter instead of mapping at an erase block granularity (e.g., 256 kB), the translation logic 336 of the SSD controller 335 maps at a much smaller ("fine") granularity (e.g., 4 kB). For example, when new random write data arrives at the SSD, the translation logic searches for an erase block that has relatively more free space and copies all of the valid data from that erase block to another block (either at the same offset or to the beginning of that block). The SSD controller 335 then writes all of the new data (regardless of the dbn) to the erase block. Notably, the translation logic maintains its internal mapping of the data (and its locations). That is, the translation logic 336 examines the equivalent of an indirect block and translates the equivalent dbns to SSD array addresses, and further does the translation at substantially the same granularity of an expected random write operation size (e.g., 4 kB).

Log-Structured Layout Capability

The hybrid media storage architecture described herein is configured to place frequently accessed (i.e., "hot") data in smaller, faster storage (such as flash devices or SSDs) and non-frequently accessed (i.e., "cold") data in larger, slower storage (such as SATA disks or HDDs). To that end, log-structured layout capabilities can be employed to automatically place certain data in certain locations at fine granularity on the SDD and HDD hybrid storage media. As used herein, a log-structured layout capability denotes writing of data in a pattern that is efficient for sequentially-accessed devices. More specifically, a log-structured technique uses translation to convert data associated with write operations that have "temporal locality" (i.e., are performed close together in time, e.g., during a CP) to a layout that has "spacial locality" on the media (e.g., as a result of a tetris I/O transaction), even though the data is not spacially local in the address space as viewed by the client. That is, the client considers the data to be random, but because the data is either received close in time at the storage system or is de-staged together by the storage system, the data is written to the persistent storage media proximately (i.e., with spacial locality) on the device in order to get better write performance out of the device.

By employing log-structured capability, the hybrid media storage architecture may flush (write) data associated with unrelated (random) write operations to the media in a pattern that is efficient for extracting write performance from the media (i.e., the log-structured capability transposes the random write operations to sequential write operations for efficient storage on the media). In the case of HDDs, a sufficient amount of data is written to locations on disk (e.g., each track in a RAID group) in as few rotations of the disk as possible (e.g., to amortize the cost of data processing across the stripes of the group). In the case of SSDs, it is not so pertinent that the data be written concurrently, but that the data be written in a specific sequence or order that enables the data to be written in one erase-block write cycle.

The hybrid media storage architecture addresses read performance using the log-structured file system, including sequential read operations directed to data residing on the SSDs, and sequential read operations directed to data residing on the HDDs. Even though they have disk-like properties with respect to write efficiency (i.e., they need to write a large amount of data in one place in order to get efficiency), SSDs do not have such disk-like properties for read operations. That is, SSDs, such as flash, exhibit the same throughput for random read operations of pages as sequential read operations directed to the pages. Moreover, SSDs are random access at essentially flash page granularity for read operations and sequential access at flash block granularity for write operations. Thus, SSDs generally require locality to achieve good write performance, but do not require locality to achieve good read performance.

Migration of Data

According to an aspect of the invention, the hybrid media storage architecture may exploit migration of vvbns among the hybrid storage media of the storage system. For example, assume that the log-structured file system 240 services a random write operation workload and initially places the associated random data in the SSDs 330 of the SSD array 340. Note that, at this time, there may not be any storage space allocated for the random data on the HDDs 360 of the HDD array 350. Subsequently, the random data becomes "cold" (i.e., it has not been accessed in some time) and it is desired to store other "hot" data in the SSDs. Note that the classification of data as "cold" or "hot" is determined, e.g., by a policy that indicates when the data was last accessed. If there is not storage space previously allocated on the HDDs that could accommodate the cold data, then the log-structured file system allocates such space and migrates (moves) the data using, e.g., the data structures associated with the HDDs.

More specifically, the file system 240 decides which blocks are to be moved from the SSDs of the SSD array 340 and which pattern to use to write those blocks on the HDDs of the HDD array. In an illustrative embodiment, blocks containing related file data are arranged on the HDDs within at least two regions containing a contiguous range of fbns. When identifying a block in the SSD that has become cold, the log-structured file system first determines the identity of the block (i.e., determines that the block is related to a particular file within a particular fbn range) and then determines whether there are other blocks closely related to this block (i.e., in terms of organizing them within a region) that are also becoming cold, and that can be moved together to the HDDs, e.g., in a tetris I/O transaction. Notably, these decisions are made based on the fbn space of the file system, rather than the dbn space of the HDDs. In order to move the blocks from the SSDs to the HDDs, the vvbn-to-pvbn mappings of the blocks are changed. However, decisions as to which blocks to move are not made based on the pvbns of the blocks, but rather on their fbns and their relationship among files that may share the blocks.

When a decision has been made to move data from the SSDs to the HDDs, the file system 240 illustratively uses its consistency model event (i.e. a CP) to move the data. A background process examines the data on the SSDs and renders a decision as to which data to move because it is cold (i.e., has not been access for some time) or because of some other policy. Illustratively, the identified cold data is retrieved from the SSDs, loaded into memory 124 and a CP is performed to direct the cold data to the appropriate region on the HDDs. The appropriate region may be determined using a tag comprising the fbn and the relationship among different files that may be sharing the same blocks, e.g., as in the case of snapshots discussed further below. The log-structured file system illustratively uses the same data structures to write the cold data to the HDDs that it uses to search and identify related blocks that are stored in the SSDs. These data structures include the vvbns and pvbns indicating the locations of the blocks within the region. Notably, both the vvbn and pvbn of a data block is stored at the fbn indirect block level.

Assume one or more cold data blocks are identified in the SSDs of the SSD array 340, cleaned and then moved to the HDDs of the HDD array 350. At fine granularity, though, the data resides in both locations (HDD and SSD) until the freed SSD block location is reused. Because the pvbn stored in the metadata may also still reference the SSD block location, a read operation may benefit from effectively a "cache hit" by reading this SSD pvbn and finding that the desired data is still there. A key observation is that the pvbn stored in the file metadata is a performance hint, whereas the vvbn is the authoritative information used to find the data if the pvbn no longer references the desired data. Note that the container file metadata maps the vvbn to the authoritative pvbn.

In other words, when cleaning and moving the data block from one pvbn on the SSD to another pvbn on the HDD, there is a period of time before the indirect block for the file is changed to update the pvbn on the HDD. During this period of time, the indirect block still indicates (via the pvbn) that the data block may still be resident in the SSD. Accordingly, when accessing the file during this period, the file system can read the data block from the SSD, even though its "official" location is in the HDD. The file system may exploit this aspect of the architecture to allow portions of the hybrid media storage system to behave similar to a cache.

For instance, the hybrid media storage architecture illustratively maintains an amount of available space in the SSDs in order to optimize random write operations. However, until the time the file system overwrites block locations of that available space in the SSDs, old data resident in those block locations are still valid and can be accessed. The hybrid media storage architecture may use the available storage space in the SSDs to achieve improved random write throughput. Accordingly, the file system exploits this property of the architecture to avoid the latency involved with accessing the HDDs (i.e., to avoid one or more I/O operations to the HDDs).

As another example, assume a snapshot is generated by the log-structured file system 240 and stored in SSDs of the SSD array 340. An example of a snapshot is described in U.S. Patent Application Publication No. US2002/0083037 A1, titled Instant Snapshot, by Blake Lewis et al. and published on Jun. 27, 2002, which application is hereby incorporated by reference. Once captured in a snapshot, the fbn-to-vvbn mapping for data is immutable. However, the vvbn-to-pvbn mapping may change, which is also exploited by the hybrid media storage architecture to overcome limitations of the prior art that restrained movement of a snapshot block. That is, once a block is stored in a location and snapshotted, that snapshot block could not previously be moved because its contents cannot be overwritten. However, the vvbn-to-pvbn translation associated with vvols is changeable by the snapshot. In other words, a snapshot renders the fbn-to-vvbn translation immutable, but leaves the vvbn-to-pvbn translation changeable. This changeable level of translation provides the ability to migrate aging snapshot data resident in, e.g., SSDs to HDDs, thereby freeing-up space in the expensive SSDs to store new data that may benefit from the higher access (e.g., I/Os per gigabyte) properties of flash storage.

Operation of Hybrid Media Storage System

Figure 4:
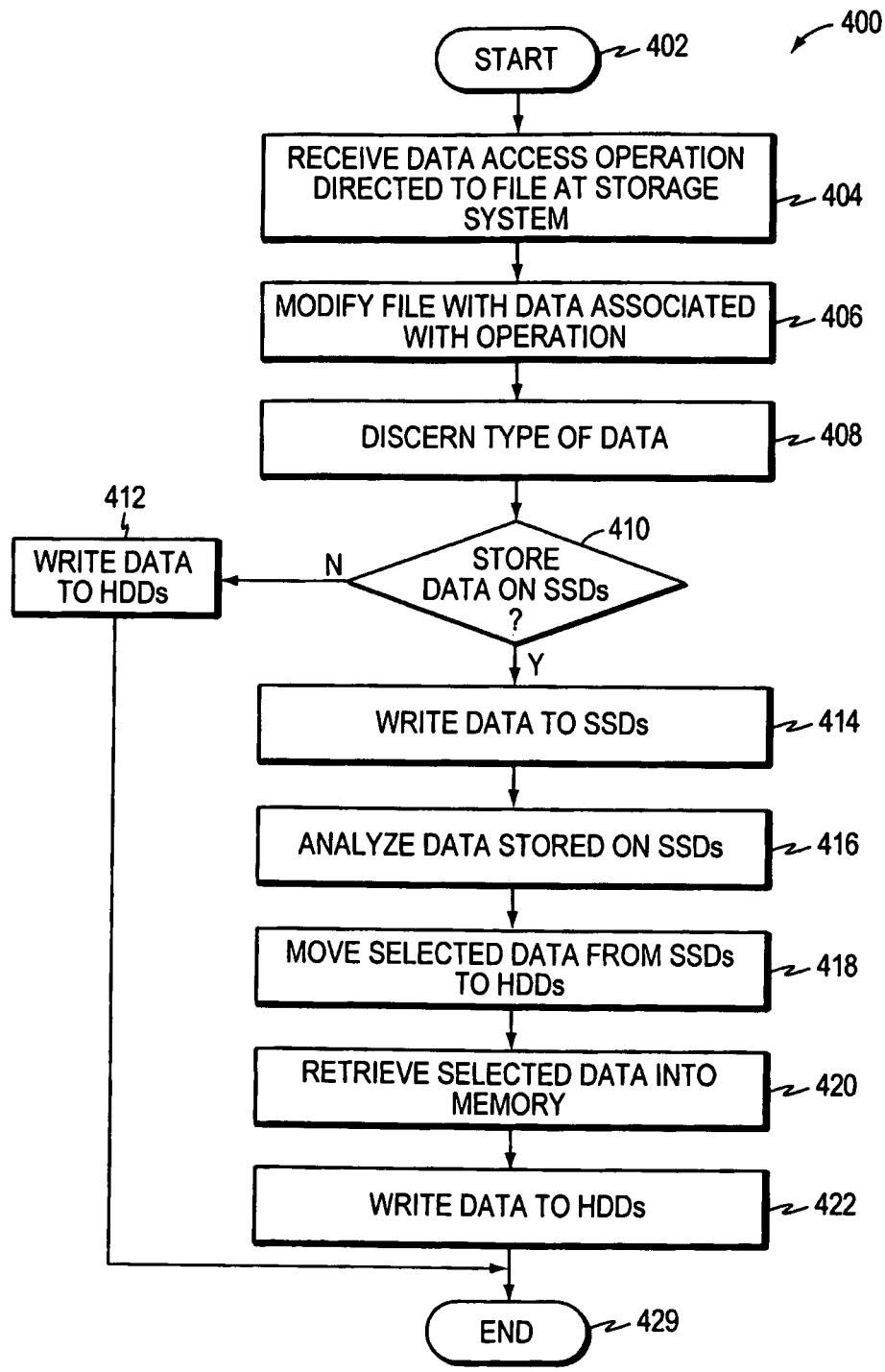
FIG. 4 is a flowchart illustrating an exemplary operational procedure of the hybrid media storage architecture of the storage system in accordance with the present invention.

FIG. 4 is a flowchart illustrating an exemplary operational procedure of the hybrid media storage architecture of the storage system in accordance with the present invention. The procedure 400 starts at Step 402 and proceeds to Step 404 where a data access request, e.g., a write operation, directed to a data container (e.g., a file) is issued by a client and received at the storage system. In Step 406, the log-structured file system processes the write operation by, e.g., modifying the file with write data associated with the operation.

In Step 408, the log-structured file system examines the write operation to discern the type of data, e.g., random write data or large sequential write stream data, and decide on which media to store the data. In Step 410, the log-structured file system invokes policy controls to determine (based on the type of data) whether that data should be stored initially on the relatively fast, expensive SSDs (or directly on the relatively slow, inexpensive HDDs). Note that the file system may also invoke heuristics that, by default, ensures that data associated with random write operations are initially stored on the SSDs. Illustratively, the type of data that is a good candidate for storage on the SSDs has characteristics of being both hot and randomly accessed. If the data is either not randomly accessed or is cold, then the data is a good candidate for storage (placement) on HDDs because subsequent accesses to that data do not require the high performance attributes of the SSDs. For example, the heuristics may imply that data associated with a large sequential write stream operation will be accessed (read or written) sequentially in the future and, in that case, the data is stored directly on the HDDs.

If a decision is made to store the data directly on the HDDs, the log-structured file system writes the data to the HDDs, e.g., during a consistency model event (CP) of the system in Step 412. The procedure then ends at Step 429. However, if a decision is made to store the data on the SSDs, the log-structured file system writes the data to the SSDs during the CP in Step 414. Thereafter, in Step 416, the types of data stored on the SSDs are analyzed and, in Step 418, a decision is made to move selected data from the SSDs to the HDDs. In Step 420, the selected data is retrieved (read) into memory and, in Step 422, the file system stores (writes) that data to one or more regions of the HDDs during a CP. Notably, the file system maintains the notion of block-granular placement of data onto both media in accordance with the log-structured techniques of the hybrid media storage architecture described herein. The procedure then ends at Step 429.

While there have been shown and described illustrative embodiments of a hybrid media storage architecture having a log-structured file system configured to control hybrid storage media of a storage system, it is to be understood that various other adaptations and modifications may be made within the spirit and scope of the present invention. For example, in one or more embodiments, the architecture may employ log-structured layout capabilities configured to perform write operations directed to relatively large block sizes/granularity to thereby extract improved performance from SSDs having even "less capabilities" than those described herein. For example, by using log-structured write allocation, the architecture can keep track of free blocks at fine granularity, while utilizing a write allocation method that chooses areas of the flash media that has sufficient free space for large write operation sizes.

Figure 5:
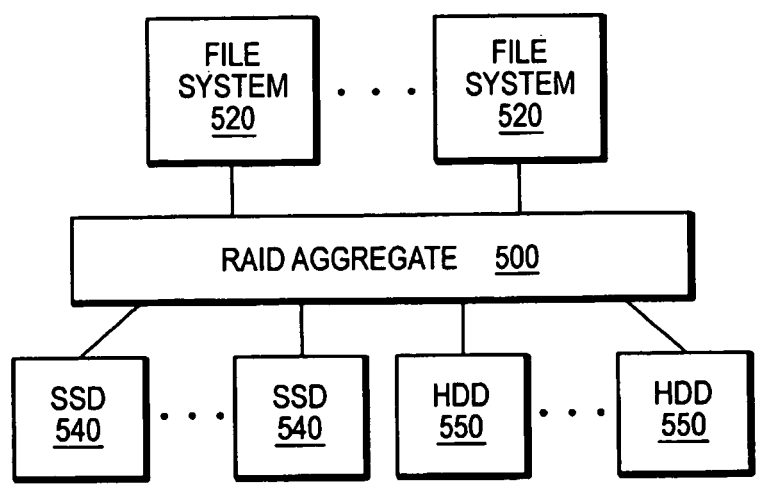
FIG. 5 is a schematic block diagram of a RAID aggregate that may be advantageously used with the present invention.

In addition, the illustrative storage system arrangement described herein may not be the ideal vehicle for performing wear leveling in a "RAID aggregate" configuration. That is, although the illustrative embodiments disclosed herein describe the RAID module as servicing only one log-structured file system per collection of RAID groups, it may be desirable to load balance multiple file systems and multiple luns across a single group of HDDs/SSDs. FIG. 5 is a schematic block diagram of a RAID aggregate that may be advantageously used with the present invention. The RAID aggregate 500 is illustratively a facility capable of servicing multiple (e.g., log-structured) file systems 520. That is, the RAID aggregate operates as a conventional RAID controller that may aggregate multiple underlying devices (SSDs 540 and/or HDDs 550) whose storage is presented to the file systems as multiple containers, such as luns. Notably, wear leveling is performed separately (at each SSD 540) from log-structured write allocation (at each file system 520) to ensure that each replaceable unit (SSD) wears uniformly. Thus, if one or more SSDs are shared among multiple file systems, it is not appropriate to perform wear leveling at the file system level. Although it is possible to implement wear leveling at the file system level if there is only one file system present in the system, such a configuration would not allow the architecture to scale to multiple file systems.

The foregoing description has been directed to specific embodiments of this invention. It will be apparent, however, that other variations and modifications may be made to the described embodiments, with the attainment of some or all of their advantages. For instance, it is expressly contemplated that the components and/or structures described herein can be implemented as a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A storage system, comprising:
a plurality of storage media organized as hybrid storage media that cooperate to provide a total storage space of the storage system, the hybrid storage media including solid-state devices (SSDs) and hard disk drives (HDDs), wherein the total storage space of the storage system is configured as one or more aggregates, each of the one or more aggregates storing at least one virtual volume; and
a storage operating system, when executed by a processor of the storage system, configured to:
 (i) implement a mapping at a disk block-sized granularity for the SSDs and the HDDs, and perform at least one of an initial placement of data, migration of the data, and write allocation of the data among storage space locations of the hybrid storage media, wherein the migration of the data is from the SSDs to the HDDs based on file block numbers (FBNs) of the data rather than a device block numbers (DBN) space of the HDDs, (ii) migrate selected data from a SSD location to a HDD location, wherein a virtual volume block number (VVBN)-to-a physical volume block number (PVBN) mapping is updated to indicate that the selected data has been migrated, and (iii) access the selected data from the SSD location, via a read operation, until one or more indirect blocks associated with the migrated selected data is updated to no longer reference the PVBN for the SSD location and the selected data at the SSD location is overwritten with new data.

2. The storage system of claim 1 wherein a log-structured file system of the storage operating system implements the mapping.

3. The storage system of claim 1 wherein the storage operating system is further configured to implement heuristics and policies that initially write the data on any of the media and thereafter move the data between the hybrid storage media at the block-sized granularity without manual enforcement.

4. The storage system of claim 3 wherein the heuristics and policies are directed to types of data processed by the storage operating system.

5. The storage system of claim 1 wherein the storage operating system is further configured to implement placement of the data within regions of the HDDs by designating block locations on the HDDs where the data resides.

6. The storage system of claim 5 wherein the storage operating system is further configured to apply one or more log-structured techniques to improve random write performance of the SSDs and to move the data in the disk block-sized granularity between the SSDs and HDDs.

7. The storage system of claim 1 further comprising a parity protection module configured to cooperate with the storage operating system to control storage operations to the SSDs and HDDs.

8. The storage system of claim 7 wherein the parity protection module comprises a RAID module.

9. The storage system of claim 7 further comprising a SSD controller of each SSD, the SSD controller configured to export geometry information to the parity protection module, the geometry information including a size of the SSD in terms of DBNs.

10. The storage system of claim 9 further comprising a translation logic of the SSD controller, wherein a DBN includes a logical address that the SSD controller presents to the parity protection module and that is subject to translation mapping to a physical address of the SSD by the translation logic.

11. The storage system of claim 10 wherein the translation logic is configured to perform wear leveling to reduce failure of the SSD due to repeated erasure and writing of the SSD.

12. The storage system of claim 11 wherein the translational logic is further configured to, in response to accessing an erase block via a write operation, move the erase block to a new location on the SSDs and further configured to make a previous location of the erase block available for reuse by a subsequent write operation.

13. The storage system of claim 7 wherein the parity protection module is further configured to organize the SSDs as one or more parity groups and further configured to manage parity computations and topology information used for placement of data on the SSDs of each parity group.

14. The storage system of claim 1 wherein the HDDs are apportioned into regions of related data in accordance with a data layout format of the storage operating system so that a first region associated with a first contiguous range of FBNs on the HDDs stores a set of first related data that includes first active file data and first snapshot data associated with a first file, and a second region associated with a second contiguous range of FBNs on the HDDs stores second related data that includes second active file data and second snapshot data associated with a second file.

15. The storage system of claim 14 further comprising a file system implemented by the storage operating system, the file system configured to implement the data layout format for the first active file data and the first snapshot data, wherein the first active file data is associated with a current time and the first snapshot data is associated with one or more previous times.

16. The storage system of claim 1 wherein the storage operating system is further configured to utilize the PVBN for the SSD via the read operation and stored in the indirect block to access the selected data from the SSD location, until the indirect block associated with the migrated selected data is updated to reference the PVBN for the HDD.

17. An apparatus, comprising:

a hybrid storage media configured to connect to a computer system, the hybrid storage media including solid-state devices (SSDs) of a SSD array and hard disk drives (HDDs) of a HDD array, wherein the HDD array and the SSD array are configured as one or more aggregates, each of the one or more aggregates storing at least one virtual volume; and a storage operating system of the computer system configured to, when executed by a processor of the computer system, control the hybrid storage media with a first data layout format and a second data layout format, wherein the first data layout format provides write access to data containers stored on the SSDs to enable servicing of random data access operations directed to the SSD array, wherein the second data layout format provides sequential read access to large data containers stored on the HDDs to enable servicing of data stored on the HDD array, the storage operating system further configured to migrate selected data from a SSD location to a HDD location, where a virtual volume block number (VVBN)-to-a physical volume block number (PVBN) mapping is updated to indicate that the selected data has been migrated, the storage operating system further configured to access the selected data from the SSD location, via a read operation, until an indirect block associated with the migrated selected data is updated to no longer reference the PVBN for the SSD location and the selected data at the SSD location is overwritten with new data.

18. The apparatus of claim 17 wherein a disk block-sized granularity of a 4 kB block size is utilized for mapping the SSDs and the HDDs.

19. The apparatus of claim 18 wherein the storage operating system is further configured to implement one or more data layout techniques, the one or more data layout techniques including a first set of write anywhere techniques to enable placement of the data anywhere in available space on the SSDs of the SSD array.

20. A computer-implemented method, comprising:

processing a write operation at a storage system, the write operation directed to a data container serviced by the storage system;

examining the write operation to discern a type of data associated with the write operation, the type of data including one of random write data and sequential write stream data;

in response to the type of data being the random write data, initially storing the random write data on solid-state devices (SSDs) of a SSD array of the storage system mapped at a block-sized granularity;

in response to the type of data being the sequential write stream data, storing the sequential write stream data on hard disk drives (HDDs) of a HDD array of the storage system, wherein the HDD array and the SSD array are configured as one or more aggregates, each of the one or more aggregates storing at least one virtual volume, and wherein the HDDs are apportioned into regions of related data in accordance with a data layout format of the storage operating system;

determining that first data is to be migrated from a first SSD location of the SSDs of the SSD array to a first HDD location of the HDDs of the HDD array of the storage system;

determining that second data is to be migrated from a second SSD location of the SSDs of the SSD array to a second HDD location of the HDDs of the HDD array of the storage system based on a proximity between file block numbers (FBNs) of the second data and the FBNs of the first data;

migrating the first data and the second data from the SSDs to the HDDs, where a virtual volume block number (VVBN)-to-a physical volume block number (PVBN) mapping is updated to indicate that the first data and the second data have migrated; and accessing, respectively, the first data and the second data from the SSD first location and the SSD second location, via a read operation, until a first indirect block associated with the first data is updated to no longer reference a PVBN for the SSD first location and a second indirect block associated with the second data is updated to no longer reference a second PVBN for the SSD second location.

21. The computer-implemented method of claim 20 wherein migrating the first data and the second data comprises:

retrieving the first data and the second data from the SSDs into a memory of the storage system; and storing the first data and the second data to one or more regions of the HDDs.

\* \* \* \* \*

UNITED STATES PATENT AND TRADEMARK OFFICE
CERTIFICATE OF CORRECTION

PATENT NO.       : 9,134,917 B2
APPLICATION NO.  : 12/517473
DATED            : September 15, 2015
INVENTOR(S)      : Jeffrey S. Kimmel et al.

Page 1 of 1

It is certified that error appears in the above-identified patent and that said Letters Patent is hereby corrected as shown below:

In the Specification:

Col. 8, line 52 should read:
the HDDs where data may reside, as described further herein.

Col. 9, line 7 should read:
is responsible for assuring sequential writes to the (e.g. 256kB)

Signed and Sealed this
Twenty-eighth Day of June, 2016

Michelle K. Lee
*Director of the United States Patent and Trademark Office*